(12) United States Patent
Wyluda et al.

(10) Patent No.: US 10,675,580 B1
(45) Date of Patent: Jun. 9, 2020

(54) AIR FILTRATION WITH A V-BANK FILTER APPARATUS AND METHOD

(71) Applicant: American Air Filter Company, Inc., Louisville, KY (US)

(72) Inventors: Paul Wyluda, Sadieville, KY (US); Michael Montague, Louisville, KY (US); Rahul Bharadwaj, Louisville, KY (US); Greg Clements, Prospect, KY (US); Satish Dinakaran, Washington, NC (US)

(73) Assignee: AMERICAN AIR FILTER COMPANY, INC., Louisville, KY (US)

( * ) Notice: Subject to any disclaimer, the term of this patent is extended or adjusted under 35 U.S.C. 154(b) by 252 days.

(21) Appl. No.: 15/946,433

(22) Filed: Apr. 5, 2018

(51) Int. Cl.
*B01D 46/12* (2006.01)
*B01D 46/52* (2006.01)
*B01D 46/00* (2006.01)

(52) U.S. Cl.
CPC ......... *B01D 46/125* (2013.01); *B01D 46/002* (2013.01); *B01D 46/0005* (2013.01); *B01D 46/521* (2013.01); *B01D 2271/02* (2013.01)

(58) Field of Classification Search
CPC .. B01D 46/125; B01D 46/002; B01D 46/521; B01D 46/0005; B01D 2271/02
See application file for complete search history.

(56) References Cited

U.S. PATENT DOCUMENTS

| | | |
|---|---|---|
| 6,447,566 B1 | 9/2002 | Rivera et al. |
| 8,491,689 B2 | 7/2013 | Duff et al. |
| 8,747,505 B2 | 6/2014 | Crabtree et al. |
| 8,956,433 B2 | 2/2015 | Sundvik et al. |
| 9,034,068 B2 | 5/2015 | Ball et al. |
| 9,043,989 B2 | 6/2015 | Devine et al. |
| 9,049,838 B2 | 6/2015 | Crabtree et al. |
| 9,049,839 B2 | 6/2015 | Crabtree |
| 9,185,877 B2 | 11/2015 | Crabtree et al. |
| 9,510,557 B2 | 12/2016 | Ball et al. |
| 9,687,766 B2 | 6/2017 | Crabtree et al. |

*Primary Examiner* — Robert Clemente
(74) *Attorney, Agent, or Firm* — Middleton Reutlinger

(57) ABSTRACT

A V-bank filter apparatus and method for air filtration. The V-bank filter may include varying the downstream regions between adjacent V shaped filter elements. The V-bank filter may include a housing with one or more structural supports. The structural supports of the filter housing may include one or more through openings. The filter media elements may include one or more hinges and/or flaps.

26 Claims, 11 Drawing Sheets

AIR FILTRATION WITH A V-BANK FILTER APPARATUS AND METHOD

BACKGROUND

The present embodiments relate to a method and apparatus for a filter, with particular embodiment shown for a filter apparatus and method for a V-bank filter.

Typical V-bank filters are accompanied by high static pressure drop. The pressure drop may be caused by the high resistance of the filter material and aerodynamic drag caused by the frame supporting the filter material. Thus there is a need to reduce the overall static pressure drop of the V-bank filter used in an air handling unit.

SUMMARY

In one aspect, one embodiment of a V-bank filter comprises a filter media arranged in one or more filter elements in a row of V configurations. In some embodiments, the filter media defines a plurality of upstream inlets corresponding to each of the V configurations and a plurality of downstream outlets corresponding to a region between the adjacent V configurations. In various embodiments, the V-bank filter may include a housing having one or more support structures adjacent at least one of an upstream edge and a downstream edge of the one or more filter elements. Moreover, in some embodiments, at least two of the regions between the adjacent V configurations may define a different volume.

In some embodiments, the V configurations may include a hinge connecting two of the one or more filter elements. In some embodiments, the hinge may be adjacent the one or more support structures. In various embodiments, at least one of the one or more filter elements may include a flap extending along at least one of the upstream edge and the downstream edge. Moreover, in some embodiments, the different volumes may be defined by different downstream angles between the adjacent V configurations. In various embodiments, the housing may include two opposing side walls, wherein the two side walls may have a curved edge defining an inlet to the V-bank filter. In some embodiments, the V-bank filter may include a gasket recessed within an upstream face of the housing. In addition, in various embodiments, the regions between the adjacent V configurations may decrease in the volume in a direction from a centerline of the V-bank filter laterally towards at least one side wall of the housing.

In some embodiments, a V-bank filter may comprise a plurality of pairs of pleated filter elements. Moreover, in some embodiments, each one of the pair of filter elements is arranged in a V configuration. In various embodiments, the V-bank filter may include a housing receiving the plurality of pairs of pleated filter elements in a row between an inlet and an opposing outlet of the housing. In some embodiments, the adjacent pairs of pleated filter elements may define a downstream angle therebetween adjacent the outlet of the housing. In various embodiments, at least two downstream angles between two of the adjacent pairs of pleated filter elements may be different.

In addition, in some embodiments, one of the at least two downstream angles between the adjacent pairs of pleated filter elements may be adjacent a side wall of the housing and may be smaller than the other one of the at least two downstream angles between the adjacent pairs of pleated filter elements. In various embodiments, the plurality of pairs of pleated filter elements may be parallel in the row. In some embodiments, the at least two downstream angles between the two adjacent pairs of pleated filter elements may decrease in size towards each one of opposing lateral side walls of the housing. In various embodiments, the housing may include two opposing end walls and two side walls defining a rectangular configuration, and at least one first support structure may be adjacent an upstream edge of the adjacent pairs of pleated filter elements and a least one second support structure may be adjacent a downstream edge of at least one of the pair of pleated filter elements. In some embodiments, at least one of the at least one first support structure and the at least one second support structure may include one or more through openings. Moreover, in some embodiments, the at least one first support structure may include the one or more through openings. In various embodiments, at least a portion of the pairs of pleated filter elements may be disposed over the one or more through openings. In some embodiments, at least a portion of the pair of pleated filter elements may include at least one of one or more hinges and one or more flaps disposed over the one or more through openings.

In various embodiments, a V-bank filter may comprise a first pair of pleated filter elements in a V configuration. In various embodiments, the V-bank filter may include a second pair of pleated filter elements in a V configuration adjacent a first side of the first pair of pleated filter elements. In some embodiments, the V-bank filter may include a third pair of pleated filter elements in a V configuration adjacent a second side of the first pair of pleated filter elements opposite the first side. In various embodiments, the V-bank filter may include a first downstream region defined between the adjacent pleated filter element of each one of the first pair and the second pair of pleated filter elements. In some embodiments, the V-bank filter may include a second downstream region defined between the adjacent pleated filter element of each one of the first pair and the third pair of pleated filter elements, wherein the first downstream region may be larger than the second downstream region creating a turbulent air flow exiting the V-bank filter.

In addition, in some embodiments, the first downstream region may be defined by a first downstream angle defined between the adjacent pleated filter element of each one of the first pair and the second pair of pleated filter elements. Moreover, in some embodiments, the second downstream region may be defined by a second downstream angle defined between the adjacent pleated filter elements of each one of the first pair and the third pair of pleated filter elements, wherein the first downstream angle may be larger than the second downstream angle. In some embodiments, the V-bank filter may include a rectangular frame configuration defined by two opposing end walls connected by two opposing side walls, and a plurality of support structures between the two opposing side walls, wherein at least one of the plurality of support structures may include one or more through openings. In various embodiments, the at least one of the plurality of support structures having the one or more through openings may be adjacent an inlet of the V-bank filter. In some embodiments, at least one of the first pair of pleated filter elements, the second pair of pleated filter elements, and the third pair of pleated filter elements may include at least one of one or more flaps and one or more hinges. In addition, in various embodiments, the at least one of the one or more flaps and the one or more hinges may be disposed across the one or more through openings. In some embodiments, each one of the first pair of pleated filter elements, the second pair of pleated filter elements, and the third pair of pleated filter elements may be parallel to each other. Moreover, in some embodiments, the V-bank filter may include a fourth pair of pleated filter elements and a fifth pair of pleated filter elements.

In various embodiments, a V-bank filter may comprise a plurality of V-shaped pairs of pleated filter media. In some embodiments, each of the V-shaped pairs of pleated filter media may have an open air receiving end and a closed air exit end. In various embodiments, each of the plurality of V-shaped pairs of pleated filter media may have an upstream angle between the pairs of pleated filter media. In addition, in some embodiments, the V-bank filter may include a first V-shaped pair of pleated filter media that may have a first predefined angle and a second V-shaped pair of pleated filter media that may have a second predefined angle. In various embodiments, the V-bank filter may have at least one V-shaped pair having the first predefined angle and a plurality of V-shaped pairs having the second predefined angle. In some embodiments, the first predefined angle may be larger than the second predefined angle.

Other objects and advantages of one or more embodiments will become apparent from the following description taken in connection with the accompanying drawings, wherein some embodiments of this invention are set forth by way of illustration and examples.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
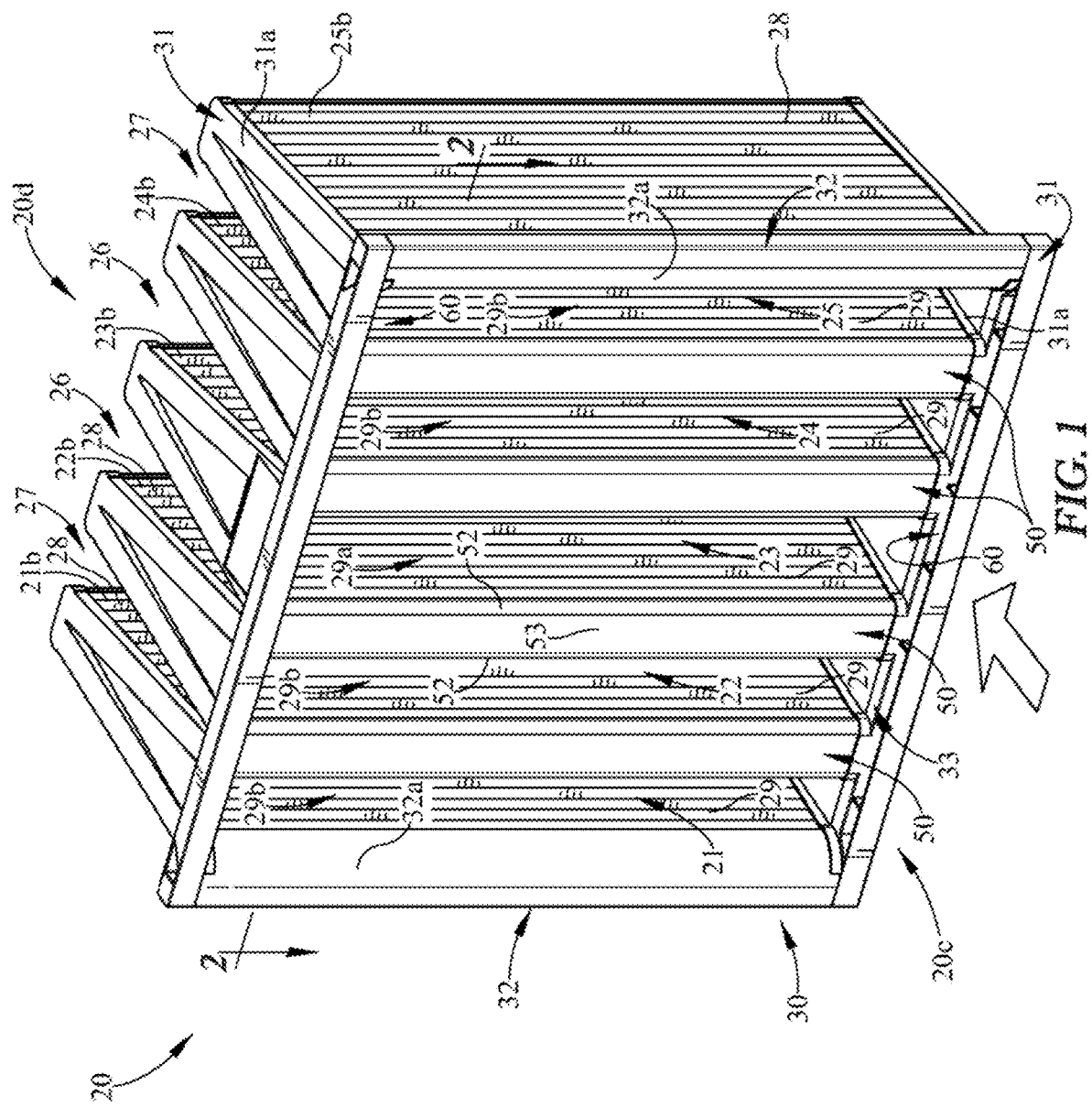
FIG. 1 is a perspective view of one embodiment of a V-bank filter apparatus.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

The V-bank filter embodiments shown in the Figures may minimize the pressure drop to correspondingly reduce the operational cost of the filter. As shown in FIGS. 1-4 the V-bank filter 20 includes a frame 30 that positions or arranges the one or more filter media elements 21a, b-25a, b in a row of aligned V configurations or shapes 21-25. In the embodiments shown, the V configurations are parallel to each other. Each filter element 21a, b-25a, b may be a sheet or planar section that may be pleated or folded in an accordion shape. Although the V-bank filter 20 is shown as a five bank filter apparatus, it should be understood that a variety of quantities of banks or V configurations may be used and still be within the scope of the invention. For example, a V-bank filter may be utilized that has three or four banks of V-shaped media pairs wherein one of the media pairs are at an air inlet first angle, and the remaining pairs are at a second air inlet angle. Alternatively, single or pairs of matching V-shaped media pairs may be implemented. For example, a V-bank filter may be utilized that has two banks of V-shaped media pairs where the first pair of V-shaped media pairs are at a first angle and the second pair of V-shaped media pairs are at a second angle. Many such variations may be implemented as described herein.

The filter media of the filter apparatus may be of a fiberglass, microglass, or synthetic materials such as but not limited to polyester, polyethylene, polypropylene, or polytetrafluroethylene. Although the V shapes or banks are defined by sheets of pleated filter media elements in the embodiments shown, the filter media of the V configurations may be a variety of materials, shapes, sizes, quantities, and constructions. For example, although the filters in the embodiments shown are pleated vertically, the filters may be pleated horizontally relative to the flow. Alternatively, the filter media elements may not have to be pleated. Further, for example, filter media elements may be made of one or more glass layers.

One or more filter apparatuses may be used together with the V-bank filter for a desired application. The filter apparatus or assembly 20 may include one or more upstream filter assemblies (e.g. a prefilter 40 shown in broken lines in FIG. 2) in some embodiments. It is to be understood that the prefilter 40 or upstream filter assembly may include a frame and filter media of a variety of shapes, sizes, constructions, and quantities which may be used and still be within the scope of the teachings herein. Moreover, in some applications, a plurality of V-bank filters 20 (e.g. same or different embodiments) and upstream/downstream filter assemblies, if any, may be used together in a filter grid to provide different downstream regions within one or more V-bank filters or different downstream regions between adjacent V-bank filters within the grid allowing a variety of air filtration characteristics, streamline patterns, or applications.

The V-bank filter may reduce the static pressure drop of the filter apparatus and/or of a plurality of filter apparatuses used in various applications. The V configurations or shapes 21-25 of the pair of filter elements define different or uneven spaced outlet regions 26, 27 between downstream outlets 28 of adjacent V configurations. These different outlet volumes or regions 26, 27 between the downstream outlets 28 or the V configurations 21-25 (e.g. two or more regions between adjacent V banks) may create a turbulent flow of air (e.g. velocity of air leaving one or more regions 26 may be different from another one or more regions 27). This turbulent or exiting flow may reduce the base drag on the V-bank filter 20 or portions thereof and may result in a lower change in pressure. In some embodiments, the downstream regions 26, 27 between at least two pairs of adjacent V shapes may be a variety of sequences or patterns of different shapes, sizes, and/or volumes in the row. For example, in the embodiment shown in FIG. 2, the downstream regions decrease in size away from the centerline of the filter apparatus laterally towards at least one of the side walls 32 of the housing 30 in the direction of the row of V spaces or configurations. As shown more clearly, in the embodiments shown in FIGS. 2 and 6, the two adjacent downstream regions 26 on opposing sides of the V configuration 23, along the filter centerline, are equal to each other and larger than the two lateral regions 27 adjacent the side walls. As a result, the regions are symmetric about the centerline of the V-bank filter in this one embodiment. The regions may not be symmetric about the centerline in some embodiments. Another example may be the outer regions may be larger than two or more interior downstream regions. Moreover, more than two downstream regions may be different from each other in some embodiments.

Figure 2:
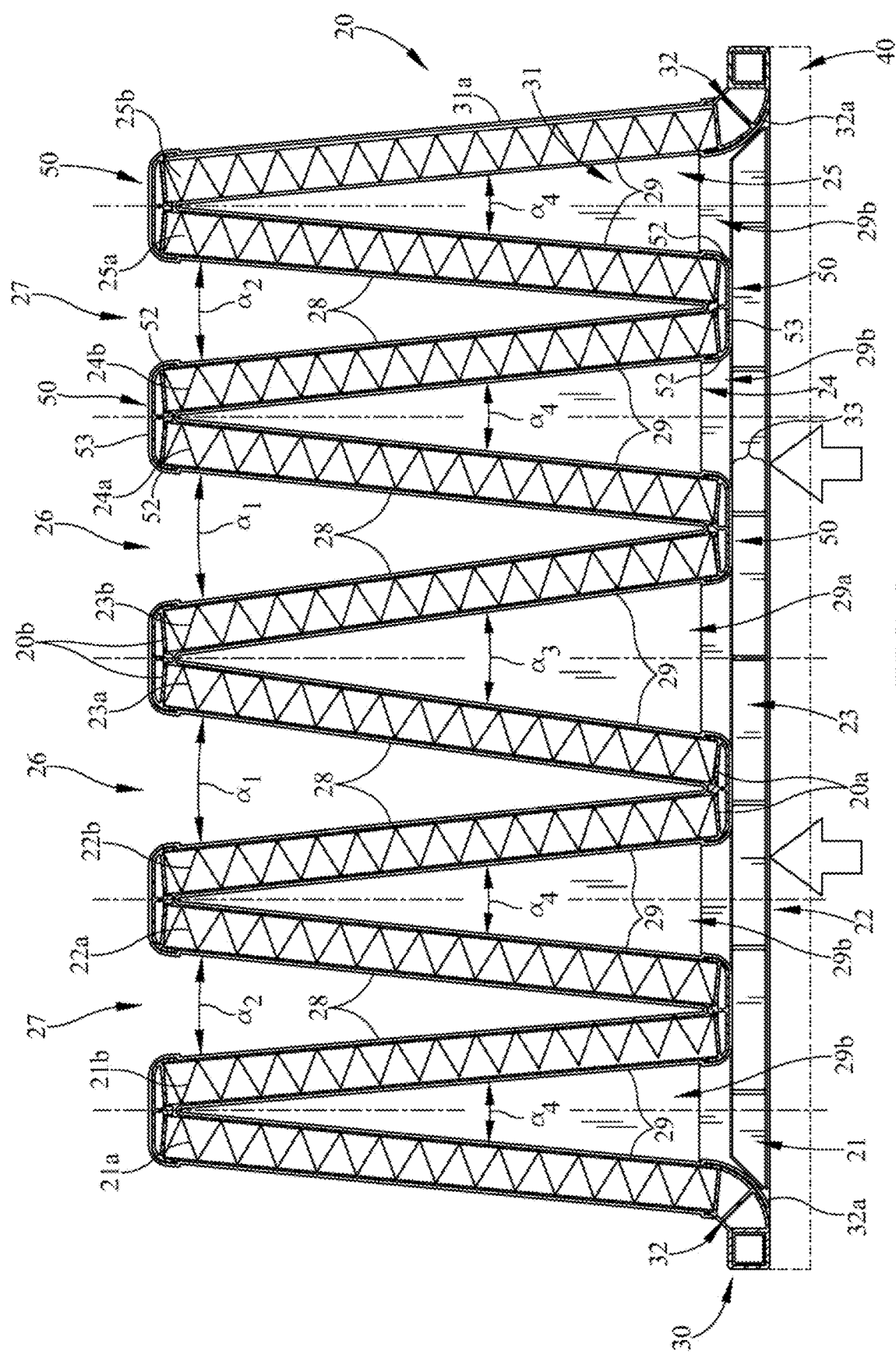
FIG. 2 is a sectional view of the embodiment of the V-bank filter of FIG. 1 taken along line 2-2.
Figure 3:
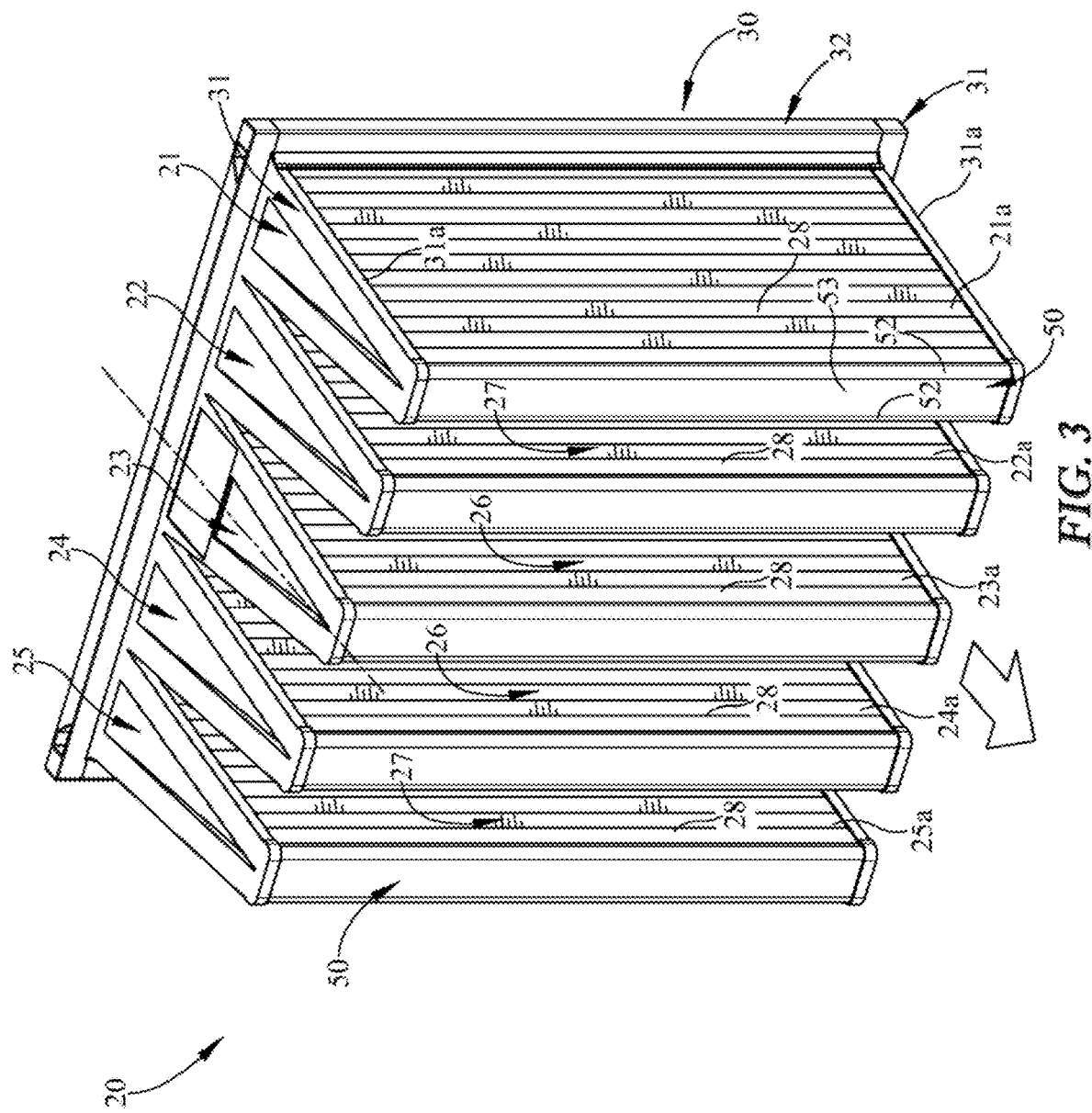
FIG. 3 is another perspective view of V-bank filter apparatus of FIG. 1.
Figure 4:
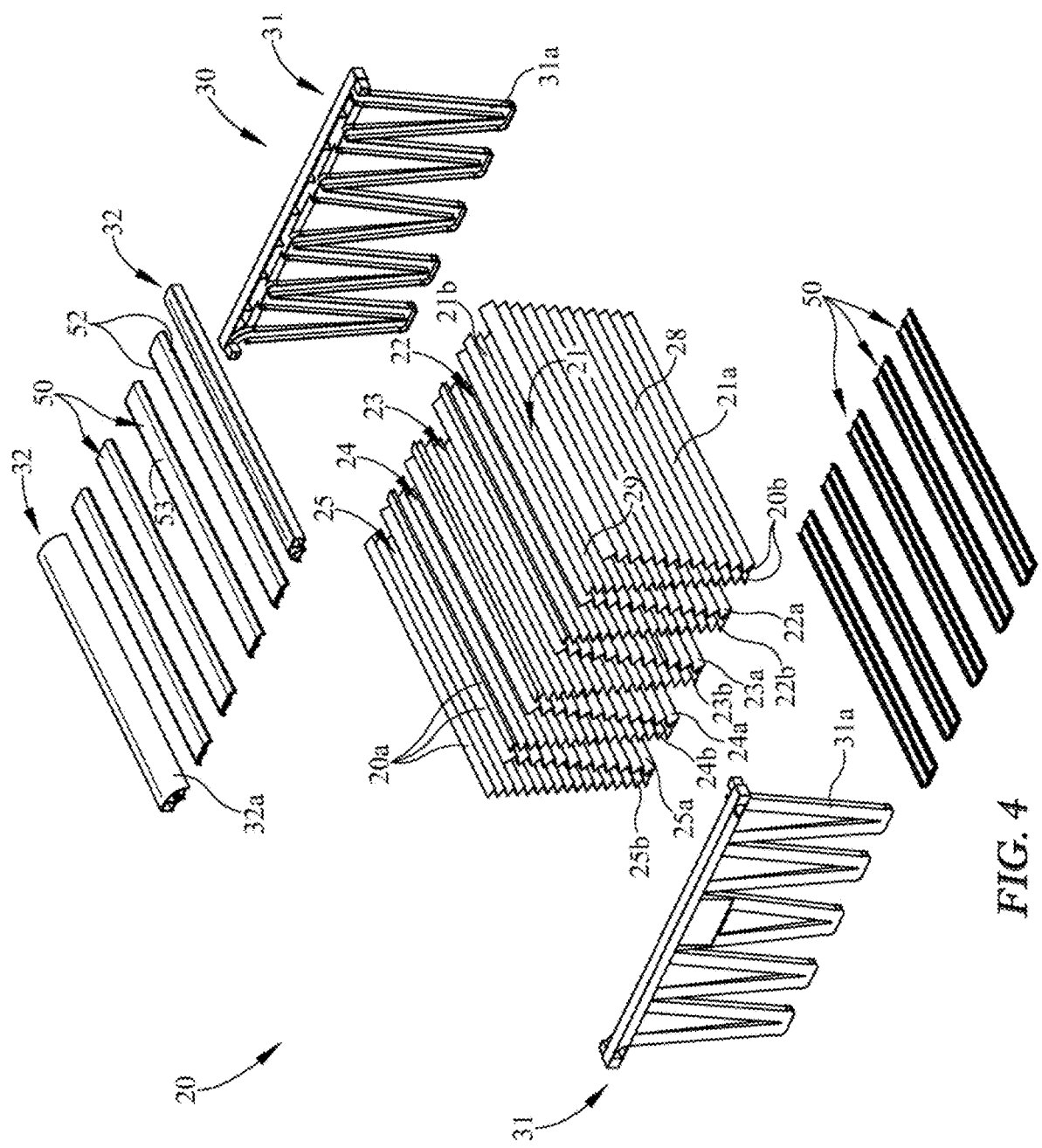
FIG. 4 is an exploded view of the embodiment of the V-bank filter of FIG. 1.
Figure 6:
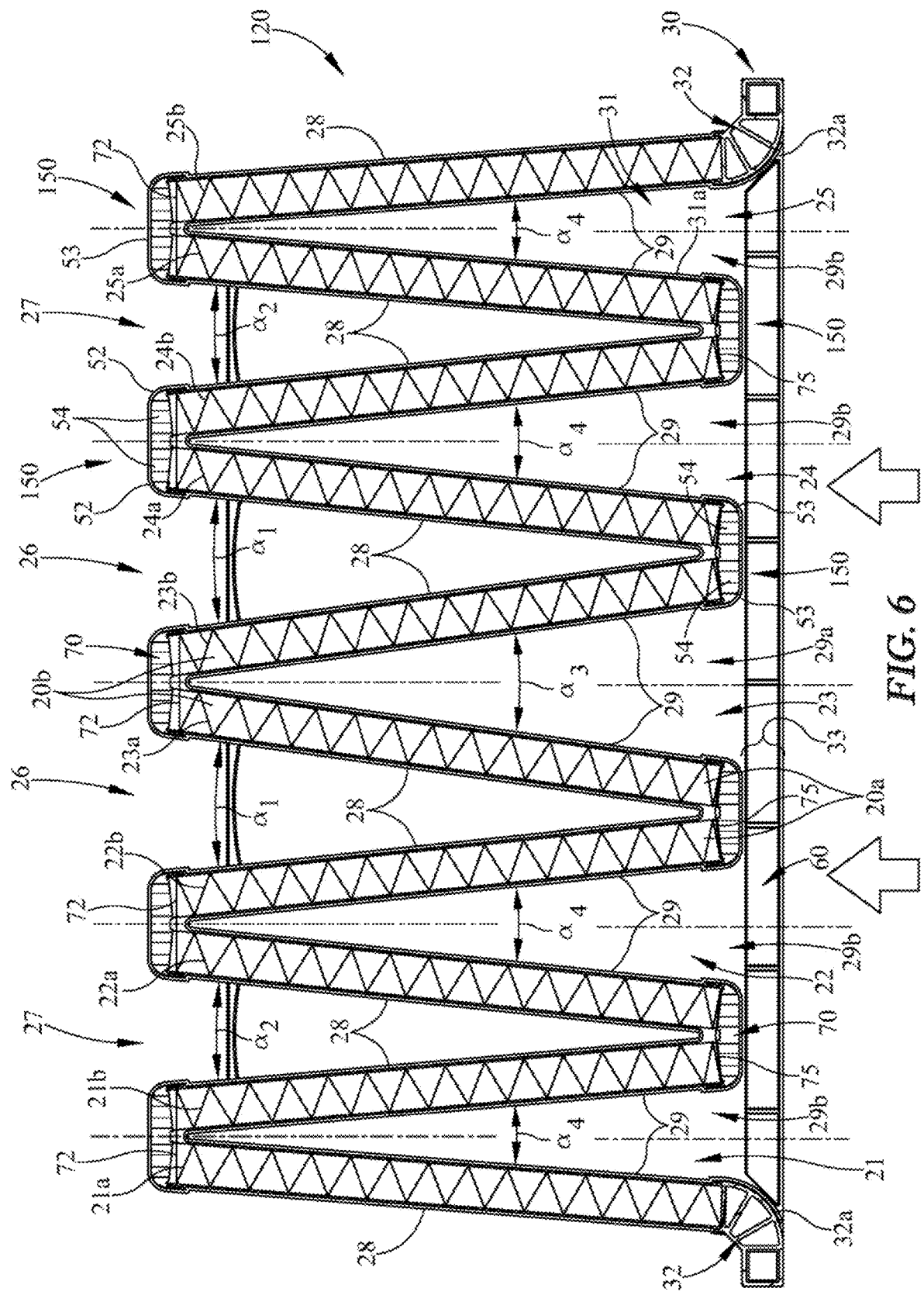
FIG. 6 is a sectional view of the embodiment of the V-bank filter of FIG. 5 taken along line 6-6.

At least two of the downstream outlet regions or volume may be different in a variety of ways or constructions. As shown in the embodiments, the downstream regions 26, 27 may be different or unevenly spaced by varying the downstream angles between adjacent outlets 28 of the adjacent V configurations 21-25. However, other constructions of the filter V-bank filter and/or housing may vary at least two downstream regions. As shown in the Figure, the downstream angle between the sheets of filter media elements or outlets 28 between adjacent pair of filter elements define the downstream angle $\alpha 1$, $\alpha 2$ in some embodiments. As shown in FIGS. 2 and 6, the downstream angle at and/or region 26 between the filter element 23b of the V configuration 23 and the filter element 24a of the V configuration 24 is larger than downstream angle $\alpha 2$ between the filter element 24b of the V configuration 24 and the filter element 25a of the V configuration 25. In the one embodiment shown, the downstream angles $\alpha 1$ adjacent the V configuration 23 are equal to each other. Also in the one embodiment, the downstream angle $\alpha 2$ between 21 and 22 and the downstream angle $\alpha 2$ between 24 and 25 are equal. As shown in the embodiment, the centerline of each V configuration 21-25 may be parallel to each other. However, in some embodiments, one or more centerlines of the V configurations may be non-parallel to each other. Further, although the depth and height of the V configurations and/or frame are shown as similar in the embodiments, in some implementations one or more of the V configuration's depth, height and/or relative position within the frame in the direction of air flow, etc. may be different in one or more of the V banks. With variation of downstream outlet regions and/or angle, the upstream inlet regions 29a, 29b defined by the V configurations 21-25 may be correspondingly varied in various embodiments. The V configurations or shapes 21-25 of the pair of filter elements define upstream or inlet regions 29a, 29b between upstream inlets 29 of the V configurations. For example in the embodiments, an upstream angle of one or more V configurations may be different from one or more upstream angles of another V configuration. As shown in the embodiment in FIG. 2, the V configuration 23 includes a larger upstream angle $\alpha 3$ than the adjacent upstream angle $\alpha 4$ of one or more adjacent V configurations 22 and 24 may create/define a corresponding larger adjacent downstream angle $\alpha 1$ therebetween. The two adjacent upstream angles $\alpha 4$ of two adjacent V configurations (e.g. 21 and 22 and/or 24 and 25) may correspond to the smaller downstream angle $\alpha 2$ therebetween. In some embodiments, there may be at least two similar angled upstream angles $\alpha 4$ of two V configurations and at least a different upstream angle $\alpha 3$ of V configuration that may correspond to unevenly spaced outlet regions and/or downstream angles between adjacent V configurations. In various embodiments, the downstream outlet regions may be larger adjacent the V configuration with the corresponding larger inlet region.

In the embodiments shown, the V-bank filter 20 may include a frame 30 receiving the plurality of pairs of filter elements. In one embodiment, the housing/frame 30 and filter media elements may be a unitary replacement filter. Alternatively, one or more filter elements and/or portions of the frame may be replaced from the remaining portion of the housing/filter media. In the embodiments shown, the frame 30 may include two opposing end walls 31 connected with two opposing side walls 32 to define a rectangular frame configuration or shape. The frame 30 may be made from a variety of one or more materials (e.g. metal, wood, plastic, cardboard, etc.). The interior surface of one or both of the end walls 31 may include a trough or guide(s) 31a (e.g. an accordion shaped trough or guides) to receive the longitudinal ends of the one or more filter media elements 21a, b-25a, b and may have the same orientation as the V configurations in the row. Some implementations of the frame 30 include one or more support structures 50 to support the filter media element(s)/frame. The one or more support structures 50 may be adjacent at least one of an upstream edge 20a and/or at least one of a downstream edge 20b of the one or more filter elements. In some embodiments, the support structure 50 may extend longitudinally between the end walls 31 and be adjacent a filter/frame inlet 20c and/or an upstream end of two adjacent pairs of filter elements. Moreover, in various embodiments, the support structure 50 may be positioned adjacent a filter/frame outlet 20d and/or an apex of the V configurations. It is contemplated that the support structures may be a variety of sizes, shapes, constructions, quantities, positions, and orientations within the frame 30.

In embodiments, the end walls 31, side walls 32 of the frame, and the support structures 50 may be fixed in suitable manners known in the art and in the same or in different manners. In aspects, the filter media element(s) may be secured to one or more portions of the frame and/or support structures by adhesive. For example, the filter media may be connected to the V shaped end walls and side walls 31, 32 by adhesives, sonic welding, friction retention, clamping or other connection mechanisms or manners. In other aspects, filter media element(s) may be connected to the end walls and side walls 31, 32 in different manners. For example, filter media may be connected to the end wall 31 in a manner different than connection to the side walls 32, such as by adhesive for end wall connectivity and welding for side wall connectivity. It is contemplated that one or more portions of the filter media and/or elements may not include adhesive in various embodiments.

As well, in some embodiments, the filter media is a continuous or non-continuous pleated media that is connected to the end walls 31, 32. For example, the filtering media forming the V-Shaped filter can be formed from a plurality of planar media connected to an adjacent planar media by secondary structures as discussed herein. Alternatively, the filtering media can be a continuous planar sheet of filtering media which is threaded or formed into the V-shaped configuration within the filter frame and between end walls. In some configurations, the filtering media may be pleated media. In other configurations, the filtering media may be non-pleated flat planar media.

In some embodiments shown in the Figures, the side walls 32 and/or support structures 50, 150 may include one or more curved longitudinal opposing edges or arcuate portions thereof. As shown in the embodiments, the opposing side walls 32 may have one or more curved surfaces or edges 32a adjacent the interior or inlet 20c of the filter media apparatus. In some embodiments, the support structures 50, 150 may include opposing longitudinal edges that may include one or more curved or arcuate surfaces 52. In various embodiments, the upstream/downstream surface of the support structure may be arcuate or convex instead of having a substantially planar surface 53 between the curved surfaces 52. In some embodiments, the curvature (e.g. convex) of the upstream support structures (e.g. adjacent the filter inlet) may face towards the upstream inlet 20c of the filter apparatus. In various embodiments, the curvature (e.g. convex) of the downstream support structures (e.g. adjacent the filter outlet) may face towards the opposite, downstream outlet 20d of the filter apparatus. The one or more curvatures or rounded edges of the side panels and/or support members may allow a smooth transition of air flow into and/or out of the V-bank filter and therefore reduce the drag applied to the structure/filter apparatus or portions thereof.

Figure 5:
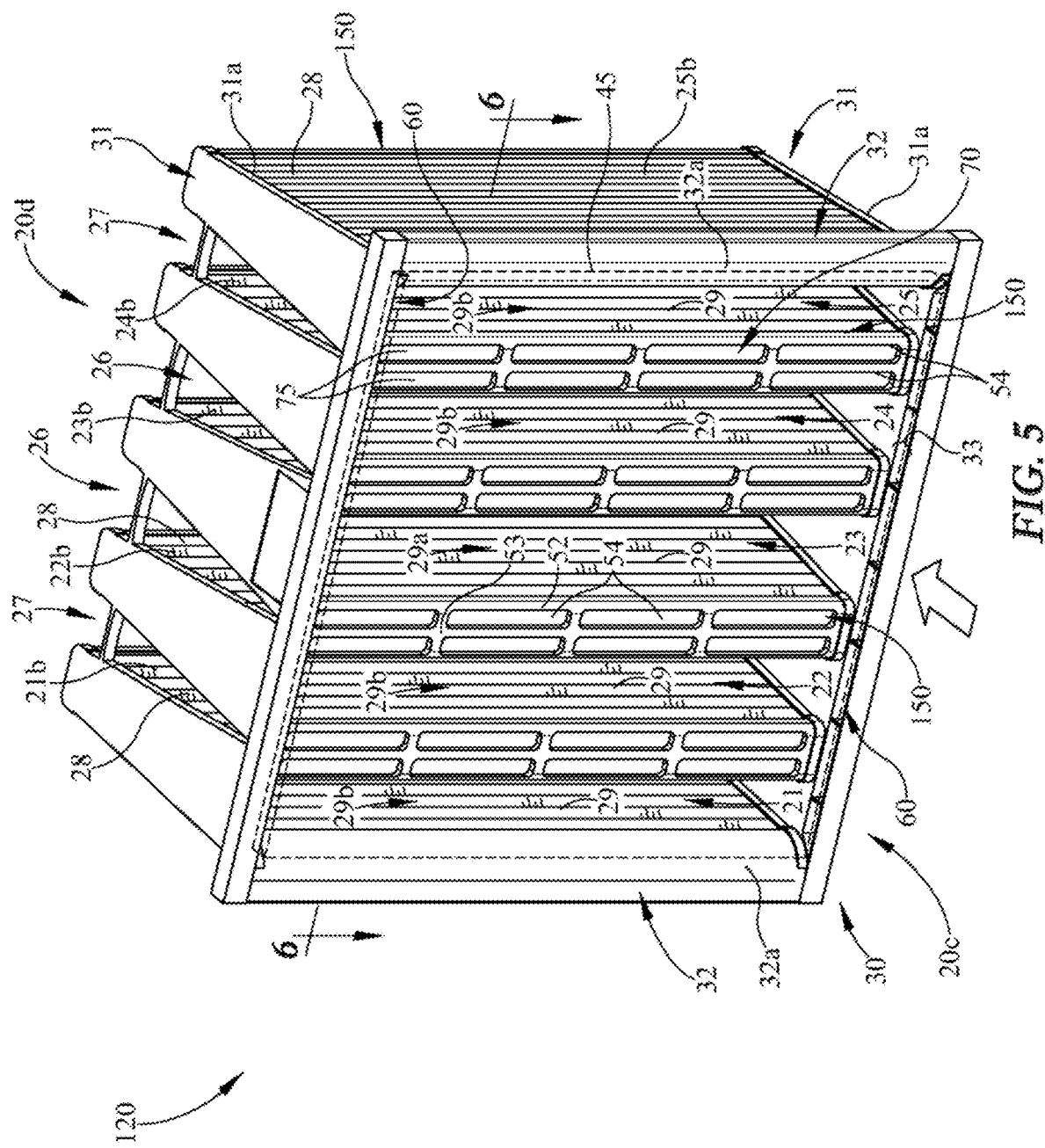
FIG. 5 is a perspective view of another embodiment of a V-bank filter apparatus.

In some embodiments of the V-bank filter 20, 120, the one or more V shape pairs of filter media elements may be offset or spaced downstream from the upstream face of the filter frame. The spacing or recess 33 may be shown about the inner periphery of the end walls and the side walls. The recess or space 33 from the front edge or filter face may allow additional space for the air entering between the V configurations or filter elements. For example, when a prefilter 40, if any, is used. Although the V configurations 21-25 may be spaced similarly from the front edge/face of the filter frame as shown in the embodiments, the spacing may be different between two or more of the V configurations. For example, a first V-shaped pair may be spaced a first distance from the upstream face of the filter frame while a second V-shaped pair may be spaced a second distance from the upstream face wherein the second distance is different than the first difference. Moreover, in some embodiments as shown in broken lines in FIG. 5, the spacing or recess 33 may allow a gasket 45 to be recessed at least partially within the inner periphery defined by the offset. In some applications, the gasket 45, if used, may be used to seal a prefilter/upstream filter assembly. Although the gasket is shown generally as a rectangular configuration, the one or more gaskets may be a variety of sizes, shapes, quantities, constructions, and positions with the frame and still be in the scope of the invention. For example, a gasket may be placed recessed along an interior area of the recess to properly seal the space within the frame along with any internal structures inserted within the frame inlet as well as any connecting structure, or alternatively the gasket may be around an external face of the frame to seal against an externally positioned structure.

In some embodiments, the filter apparatus 20, 120 may include one or more handles 60. In the embodiments shown, one or more handles 60 may be positioned adjacent the inlet 20c of the V-bank filter. The two end walls 31 may include handles or recesses 60 within the interior facing surfaces towards the filter media. Although shown that the handle(s) 60 extend between the opposing side walls 32, it should be understood that the handles 60 may be positioned at one or more portions along the inlet edge of the end wall. Moreover, in some embodiments, the handle may be positioned on one or more of the end walls, one or more of the support structures, and/or one or more of the side walls in some implementations. The handle 60 may be a variety of shapes, sizes, quantities, constructions, orientations, and positions within the V-bank filter and still be within the scope of the invention.

In the some embodiments of the V-bank filter 120 as shown in FIGS. 5-8, one or more of the support structures 150 may include one or more through openings 54. In various embodiments, the support structures 150 with one or more through openings 54 may be positioned upstream and/or downstream of the filter media adjacent the inlet 20c and/or outlet 20d of the filter apparatus. Although not shown, the side walls 32 may include through openings in some embodiments. The through openings 54 may reduce the frame drag resulting from the support structure (e.g. see FIGS. 11A and 11B for a comparison of embodiments with solid support structures and support structures with through openings). The through openings 54 may be a variety of shapes, sizes, quantities, constructions, orientations, and positions through the structural support members. For example, the one or more interior walls and/or axis defining the through opening do not have to be substantial parallel to the air flow (e.g. angled, narrowing, expanding, etc.). Further, the upstream opening does not have to the same size, shape, and/or position as the downstream opening of the through opening as shown. For example, in some embodiments, support members with through openings may be included upstream of the filter media and solid structural support members may be included downstream of the filter media. Moreover, for example, the through openings may be different in size, shape, quantity, and/or location between two or more structural support members.

It should be understood that in the embodiment of the support structure(s) 150 with one or more through openings 54 may include a cover, member, or sheet of one or more materials that may have more permeability than the support structure 150. The cover 70 is disposed over the through opening (e.g. upstream and/or downstream) to provide filtration or air flow through the through openings. Alternatively, the one or more covers 70 or portions thereof may be impermeable in some embodiments. The cover may be upstream and/or downstream of the through openings of the structural support structure. In the embodiment shown, the cover 70 is downstream of the support structure adjacent the filter inlet 20c and/or upstream of the structural support structure adjacent the filter outlet 20d. The one or more covers may be affixed to the structural supports, end walls, filter media, and/or side walls in any suitable manner known in the art (e.g. adhesive). It is contemplated that the covers may be a variety of sizes, shapes, constructions, quantities, positions, and orientations within the frame. For example, the cover may be one or more layers of material (e.g. the same or different from the filter media of the V configurations/filter media). Moreover, for example, the cover may be pleated, planar, and/or arcuate in shape.

In some implementations as shown in FIGS. 5-8, the cover 70 may be integral with the filter media of one or more filter elements 21a, b-25a, b of one or more V configurations 21-25. It is contemplated that the cover may be separately made from the filter media in some embodiments. In the embodiment shown in FIGS. 5-8, the V configurations include a pair of pleated filter elements connected by a cover 70 integral with the filter media. The cover may function as a coupling, bridge, and/or hinge 72 between or connecting the pair of filter elements (e.g. 21a and 21b) to angle the filter elements in the V shape or orientation and/or adjacent V configurations. The cover 70, in this embodiment shown, may be of the same material as the filter media elements. Alternatively, the material, construction, size, etc. may be different than the filter elements. In manufacturing the cover/hinge 72, the glue or adhesive 74 that maintains the pleat spacing may be ceased or not applied to a portion of the filter media to allow a portion of the filter media to bridge the two filter media elements and be subsequently positioned adjacent the through openings 54 of the support structure 150. It should be understood that the covers 70 may still be used with embodiments of the V-bank filter with one or more solid support structures 50. As is shown in FIG. 6, the cover/hinge 72 portion may be adjacent the downstream apex or edges 20b of one or more V configurations. It should be understood that the hinge may be used between two adjacent V configurations. In various embodiments, one or more filter elements may also include the cover 70 that may be one or more lateral flaps 75 with the hinge, if used. The flap 75 of filter media material may be manufactured by not applying adhesive during the pleating process forming a non-pleated hinge media section extending between two adjacent pleats. In such implementations, the manufacturing process of the pleated filter media integrates the flap and/or hinge into the continuous filtering media forming the V-shaped media members. Alternatively, the flap 75 and/or hinge 72 (e.g. cover) may not be integral with the filter media element in some embodiments. For example, the flap 75 and/or hinge 72 may be material simply connecting two adjacent planar filter media sections together and secured thereto by adhesive or other mechanical connection. For example, the flap 75 and/or hinge 72 may be a separate filter media strip that is adhesively applied to adjacent pleated or non-pleated filter media members in a hinge form. In other embodiments, the flap and/or hinge may be crimped or mechanically attached to adjacent media members.

Figure 7:
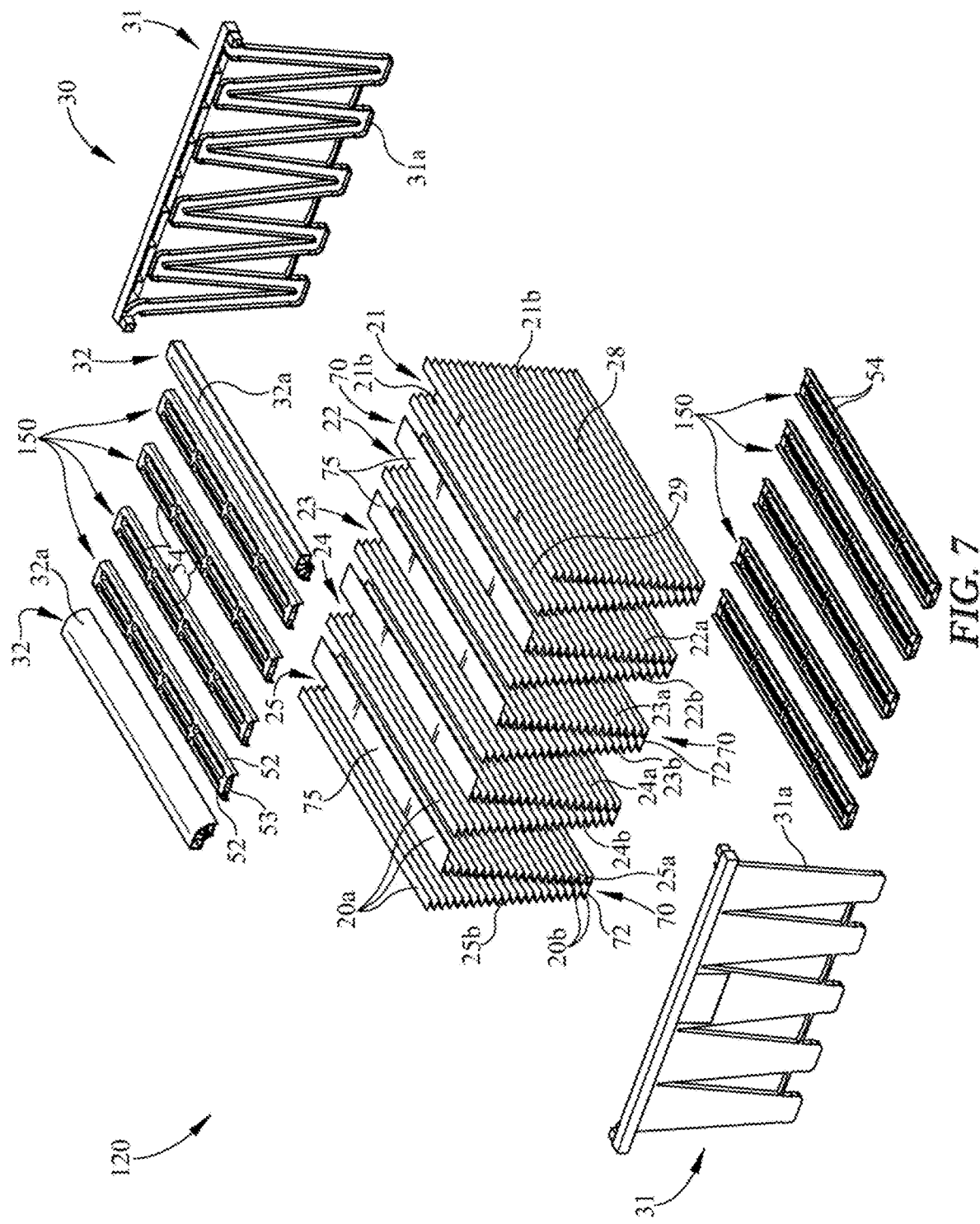
FIG. 7 is an exploded view of the embodiment of the V-bank filter of FIG. 5.
Figure 8:
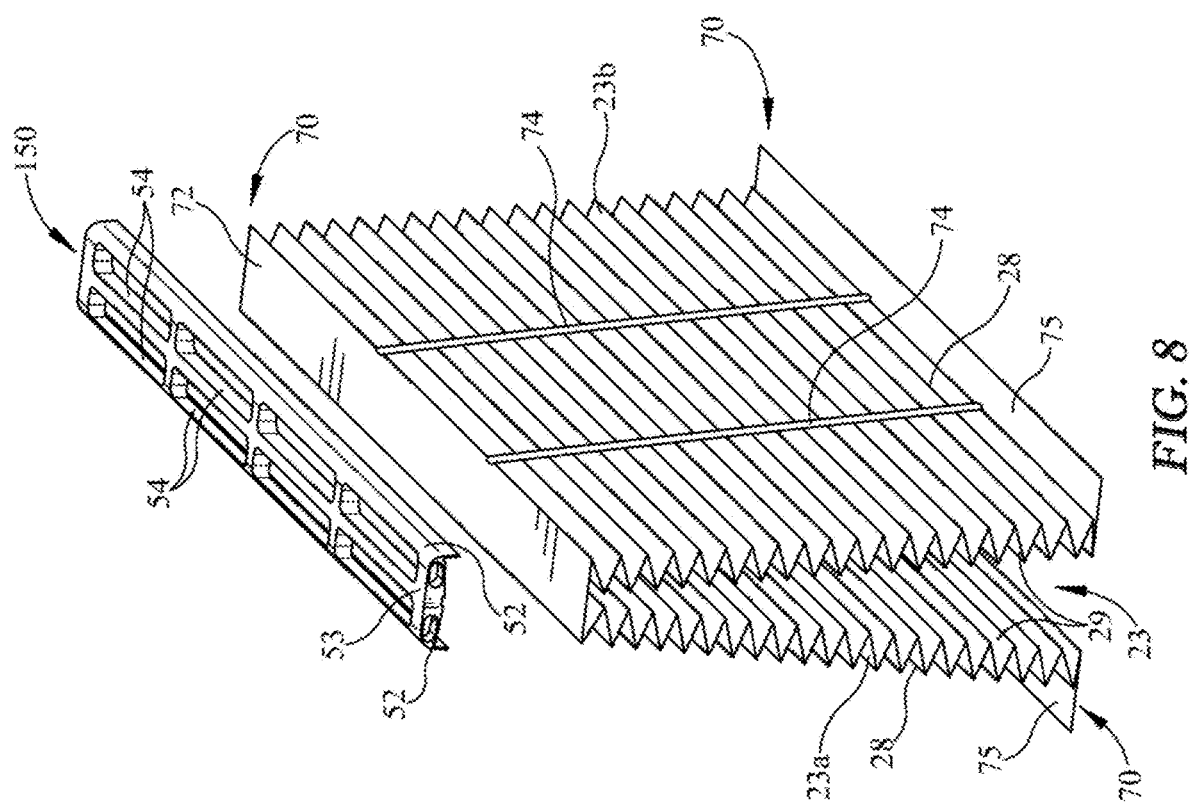
FIG. 8 is perspective view of another embodiment of a pair of pleated filer elements of FIG. 5 with the support structure exploded away therefrom.
Figures 9A, 9B:
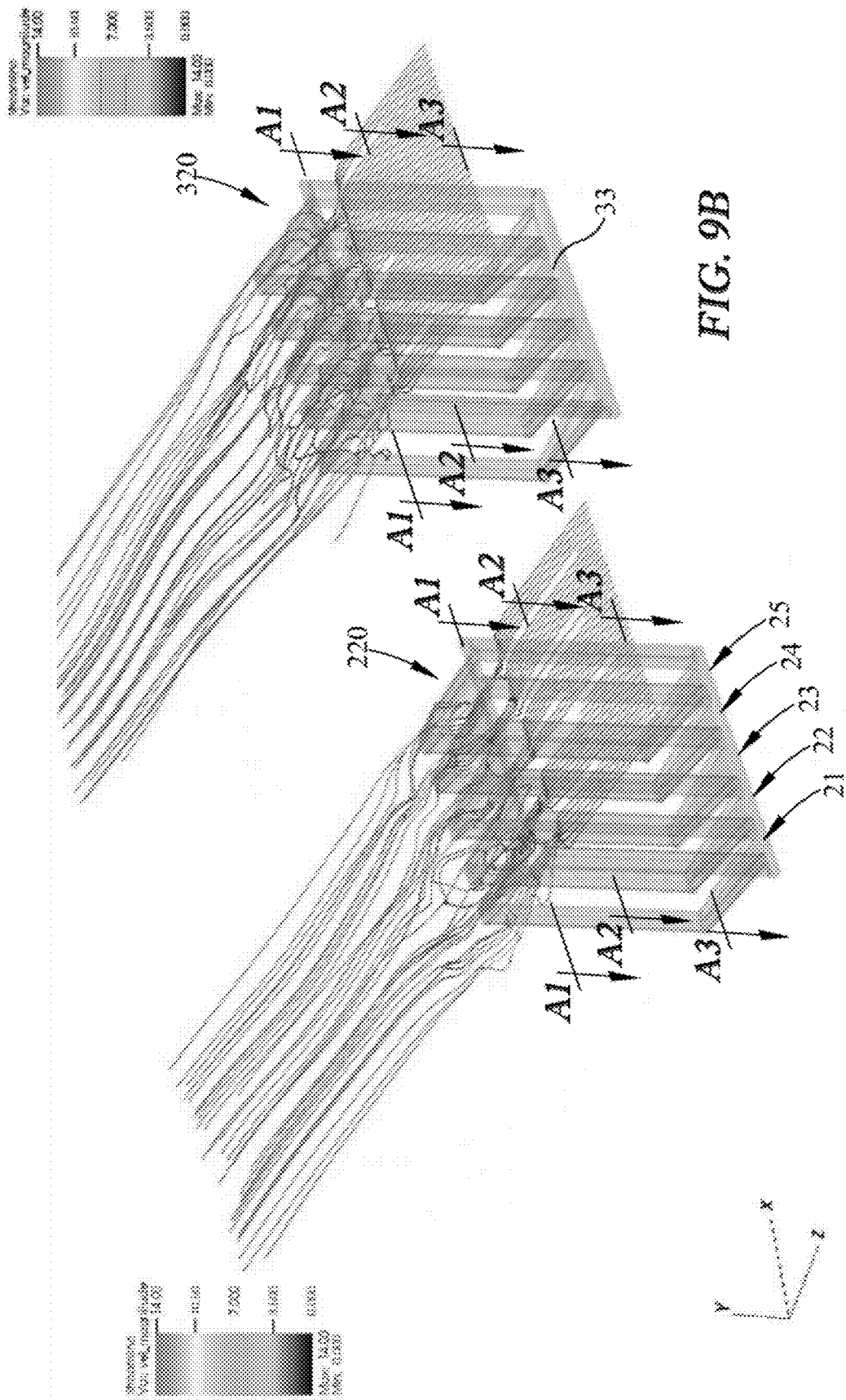
FIG. 9A is a depiction of a horizontal streamline velocity magnitude of the V-bank filter of FIG. 1, without the upstream recess, at one elevation illustrating downstream turbulence of the filter due to the different downstream outlet characteristics or regions between the V configurations.
FIG. 9B is a depiction of a horizontal streamline velocity magnitude of another embodiment of a V-bank filter with five filter V configurations and an upstream recess having similar downstream outlet characteristics or regions between the V configurations.
Figure 10A:
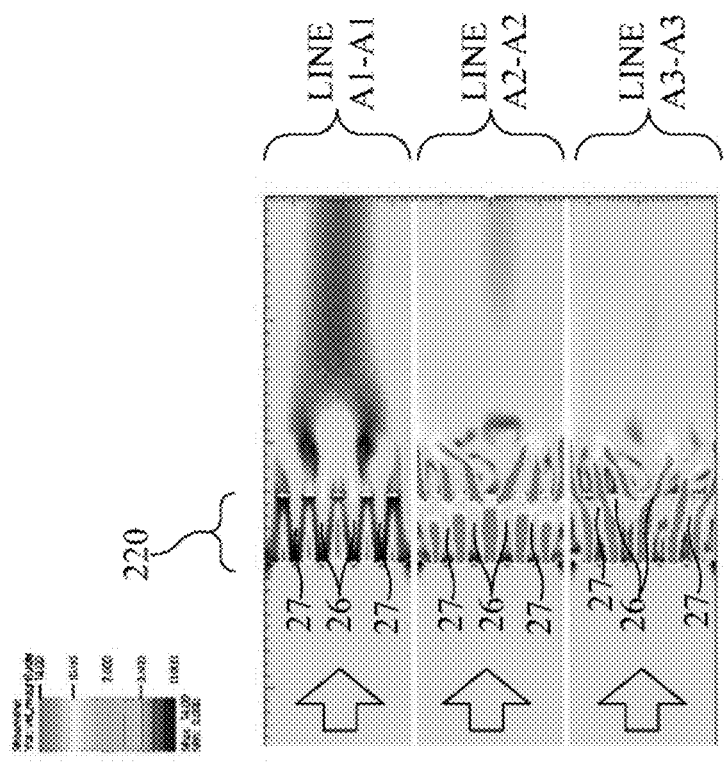
FIG. 10A is an illustration of streamline velocity magnitude taken along multiple elevations of the filter apparatus of FIG. 9A taken along lines A1-A1, A2-A2, and A3-A3 illustrating the exiting flow at multiple elevations.
Figure 10B:
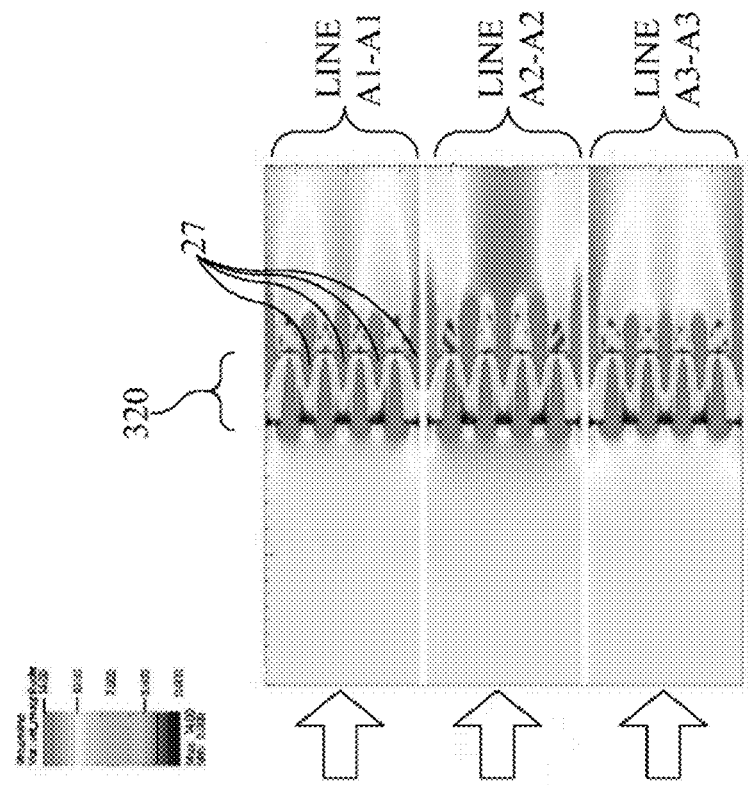
FIG. 10B is an illustration of the streamline velocity magnitude taken along multiple elevations of the filter apparatus of FIG. 9B taken along lines A1-A1, A2-A2, and A3-A3 illustrating a more laminar exiting flow or less turbulent exiting flow at multiple elevations than the embodiment of FIG. 10.

The flap 75 may extend laterally from one or more upstream edges/ends 20a and/or downstream edges/ends 20b of one or more filter elements. One or more flaps 75 of one or more filter media elements may be disposed over the corresponding through openings 54 of the support structure 150. The one or more flaps 75 may be used alone or overlapped from one or more adjacent filter elements and/or flaps 75. Moreover, in embodiments where the side wall may include through openings, one or more flaps may be used as a cover for the side wall through openings. As contemplated, the cover 70 may not be integral with the filter elements in some embodiments. As shown in FIG. 7, the flap 75 may extend from the upstream end 20a of a filter media element and extend to the adjacent upstream end 20a of the adjacent V configuration to be disposed over or extend across the through openings 54 of the support structure 150. As shown in FIG. 8, on V configuration embodiment includes flaps 75 extending outwardly from both upstream ends 20a of the corresponding filter media element and combined with a hinge 72 adjacent the downstream apex or end 20b.

Exemplars

As shown in FIGS. 9A, 9B, 10A, and 10B, two embodiments of the V-bank filter illustrate an example of the streamline velocity magnitude at an elevation(s) in the air flow direction. The V-bank filter 220 shown in FIGS. 9A and 10A may be similar to the V-bank filter 20 embodiment of FIG. 1, however without the front recess 33. As illustrated, the one or more uneven or different downstream regions 26, 27 and/or angles may create downstream turbulence to minimize the overall static pressure drop. The embodiment of the V-bank filter 320 shown in FIGS. 9B and 10B may include evenly spaced or similar downstream regions 27 and the recess 33. As illustrated more clearly in the stream lines observed at multiple elevations of FIGS. 10A and 10B, the similar downstream regions of the V-bank filter 320 of FIG. 10B may create a more laminar downstream air flow than the embodiment of the V-bank filter 220 of FIG. 10A.

Figure 11B:
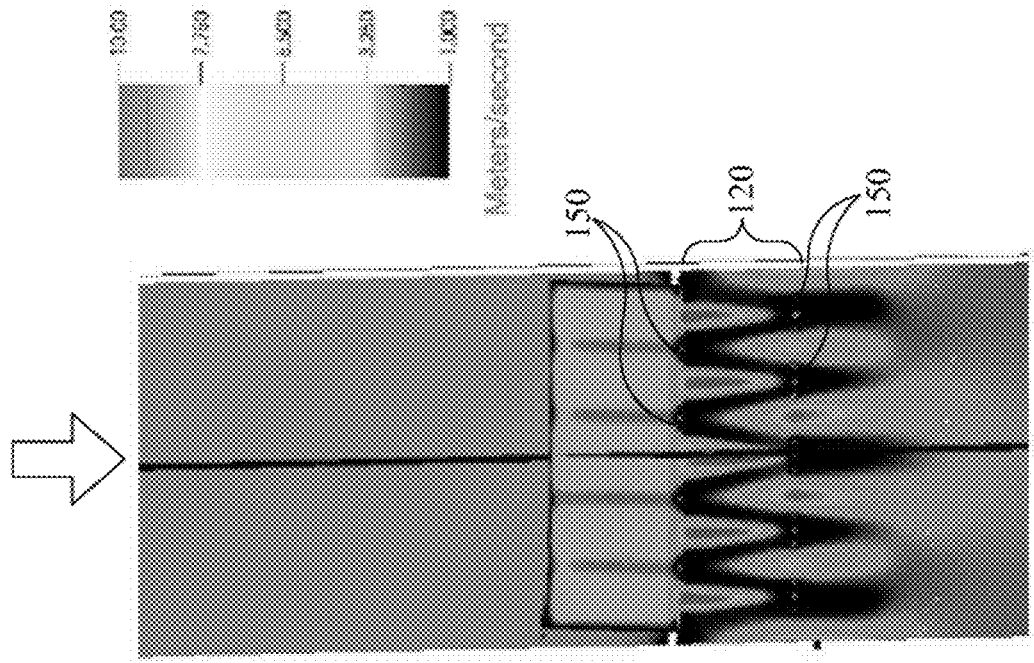
FIG. 11B is an illustration of the streamline velocity magnitude taken along an elevation along line 6-6 of FIG. 5 illustrating drag upon the support structures with through openings that is less than the drag illustrated in FIG. 11A.
Figure 11A:
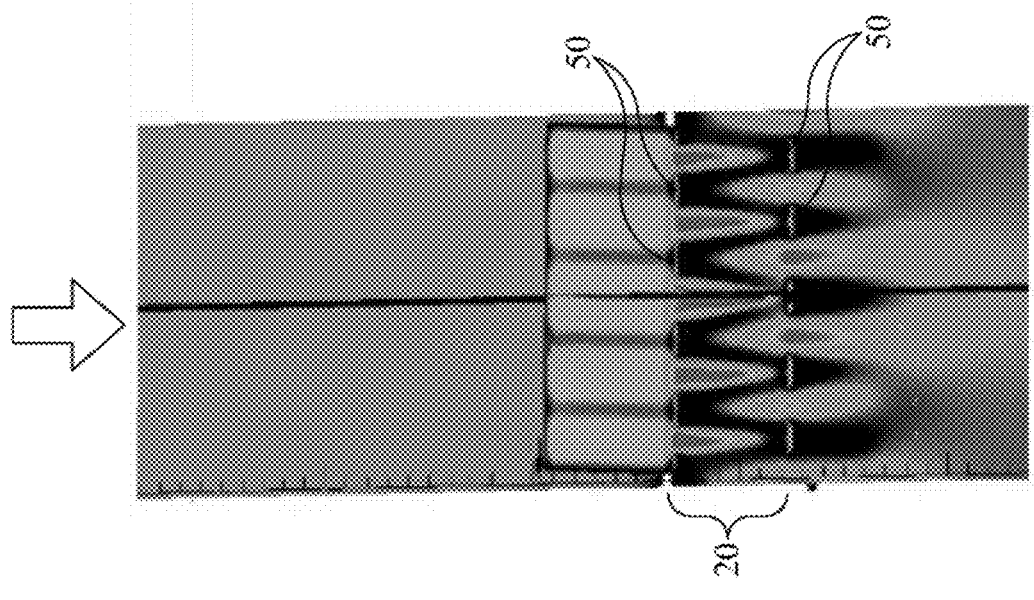
FIG. 11A is an illustration of the streamline velocity magnitude taken along an elevation along line 2-2 of FIG. 1 illustrating drag upon the solid support structures.

FIGS. 11A and 11B, illustrate an example of the velocity comparison of the stream lines occurring with one or more support structures, if any, with or without through openings. As shown more clearly in FIG. 11A, the solid support structures 50 illustrate drag and/or upstream pressure in front of the support structure. As compared to an embodiment of the V-bank filter 120 using the through openings 54 within the one or more support structures 150, the drag and/or upstream pressure on the frame may be less than the drag illustrated in FIG. 11A.

We claim:
1. A V-bank filter comprising:
   a filter media arranged in one or more filter elements in a row of V configurations, wherein the filter media defines a plurality of upstream inlets corresponding to each of the V configurations and a plurality of downstream outlets corresponding to a region between the adjacent V configurations;
   a housing having one or more support structures adjacent at least one of an upstream edge and a downstream edge of the one or more filter elements; and
   at least two of the regions between the adjacent V configurations define a different volume.
2. The V-bank filter of claim 1 wherein the V configurations include a hinge connecting two of the one or more filter elements.
3. The V-bank filter of claim 2 wherein the hinge is adjacent the one or more support structures.
4. The V-bank filter of claim 1 wherein at least one of the one or more filter elements includes a flap extending along at least one of the upstream edge and the downstream edge.

5. The V-bank filter of claim 1 wherein the different volumes are defined by different downstream angles between the adjacent V configurations.

6. The V-bank filter of claim 1 wherein the housing includes two opposing side walls, wherein the two side walls have a curved edge defining an inlet to the V-bank filter.

7. The V-bank filter of claim 1 further comprising a gasket recessed within an upstream face of the housing.

8. The V-bank filter of claim 1 wherein the regions between the adjacent V configurations decrease in the volume in a direction from a centerline of the V-bank filter laterally towards at least one side wall of the housing.

9. A V-bank filter comprising:
a plurality of pairs of pleated filter elements, wherein each one of the pair of filter elements is arranged in a V configuration;
a housing receiving the plurality of pairs of pleated filter elements in a row between an inlet and an opposing outlet of the housing;
wherein the adjacent pairs of pleated filter elements define a downstream angle therebetween adjacent the outlet of the housing; and
wherein at least two downstream angles between two of the adjacent pairs of pleated filter elements are different.

10. The V-bank filter of claim 9 wherein one of the at least two downstream angles between the adjacent pairs of pleated filter elements is adjacent a side wall of the housing and is smaller than the other one of the at least two downstream angles between the adjacent pairs of pleated filter elements.

11. The V-bank filter of claim 9 wherein the plurality of pairs of pleated filter elements are parallel in the row.

12. The V-bank filter of claim 9 wherein the at least two downstream angles between the two adjacent pairs of pleated filter elements decrease in size towards each one of opposing lateral side walls of the housing.

13. The V-bank filter of claim 9 wherein the housing includes two opposing end walls and two side walls defining a rectangular configuration, and at least one first support structure adjacent an upstream edge of the adjacent pairs of pleated filter elements and a least one second support structure adjacent a downstream edge of at least one of the pair of pleated filter elements.

14. The V-bank filter of claim 13 wherein at least one of the at least one first support structure and the at least one second support structure includes one or more through openings.

15. The V-bank filter of claim 14 wherein the at least one first support structure includes the one or more through openings.

16. The V-bank filter of claim 14 wherein at least a portion of the pairs of pleated filter elements is disposed over the one or more through openings.

17. The V-bank filter of claim 16 wherein the at least a portion of the pair of pleated filter elements includes at least one of one or more hinges and one or more flaps disposed over the one or more through openings.

18. A V-bank filter comprising:
a first pair of pleated filter elements in a V configuration;
a second pair of pleated filter elements in a V configuration adjacent a first side of the first pair of pleated filter elements;
a third pair of pleated filter elements in a V configuration adjacent a second side of the first pair of pleated filter elements opposite the first side;
a first downstream region is defined between the adjacent pleated filter element of each one of the first pair and the second pair of pleated filter elements; and
a second downstream region is defined between the adjacent pleated filter element of each one of the first pair and the third pair of pleated filter elements, wherein the first downstream region is larger than the second downstream region creating a turbulent air flow exiting the V-bank filter.

19. The V-bank filter of claim 18 wherein the first downstream region is defined by a first downstream angle defined between the adjacent pleated filter element of each one of the first pair and the second pair of pleated filter elements; and
the second downstream region is defined by a second downstream angle defined between the adjacent pleated filter elements of each one of the first pair and the third pair of pleated filter elements, wherein the first downstream angle is larger than the second downstream angle.

20. The V-bank filter of claim 18 further comprising a rectangular frame configuration defined by two opposing end walls connected by two opposing side walls, and a plurality of support structures between the two opposing side walls, wherein at least one of the plurality of support structures include one or more through openings.

21. The V-bank filter of claim 20 wherein the at least one of the plurality of support structures having the one or more through openings is adjacent an inlet of the V-bank filter.

22. The V-bank filter of claim 20 wherein at least one of the first pair of pleated filter elements, the second pair of pleated filter elements, and the third pair of pleated filter elements includes at least one of one or more flaps and one or more hinges.

23. The V-bank filter of claim 22 wherein the at least one of the one or more flaps and the one or more hinges is disposed across the one or more through openings.

24. The V-bank filter of claim 18 wherein each one of the first pair of pleated filter elements, the second pair of pleated filter elements, and the third pair of pleated filter elements are parallel to each other.

25. The V-bank filter of claim 18 further comprising a fourth pair of pleated filter elements and a fifth pair of pleated filter elements.

26. A V-bank filter, comprising:
a plurality of V-shaped pairs of pleated filter media, each of the V-shaped pairs of pleated filter media having an open air receiving end and a closed air exit end;
each of the plurality of V-shaped pairs of pleated filter media having an upstream angle between the pairs of pleated filter media;
wherein a first V-shaped pair of pleated filter media has a first predefined angle and wherein a second V-shaped pair of pleated filter media has a second predefined angle;
the V-bank filter having at least one V-shaped pair having the first predefined angle and a plurality of V-shaped pairs having the second predefined angle; and
wherein the first predefined angle is larger than the second predefined angle.

* * * * *